United States Patent [19]

Gehrs et al.

[11] Patent Number: 5,444,183
[45] Date of Patent: Aug. 22, 1995

[54] POLYMERIC ELECTRICAL ENCLOSURE WITH IMPROVED KNOCKOUT

[75] Inventors: Donald F. Gehrs, Brandon; Percy A. White, Clinton, both of Miss.

[73] Assignee: Eaton Corporation, Cleveland, Ohio

[21] Appl. No.: 158,878

[22] Filed: Nov. 29, 1993

[51] Int. Cl.[6] .............................................. H02G 3/08
[52] U.S. Cl. .................................. 174/65 R; 220/3.2; 220/266; 361/641
[58] Field of Search .............. 174/65 R; 220/3.2, 266; 361/657

[56] References Cited

U.S. PATENT DOCUMENTS

| | | | |
|---|---|---|---|
| 3,278,807 | 10/1966 | Galante et al. | 361/637 |
| 3,587,906 | 6/1971 | Pepe | 220/3.2 |
| 3,801,875 | 4/1974 | Morby et al. | 361/637 |
| 3,852,514 | 12/1974 | Lauben | 174/58 |
| 4,118,754 | 10/1978 | Duggan | 361/637 |
| 4,675,782 | 6/1987 | Hibbert et al. | 361/658 |
| 4,688,146 | 8/1987 | Newmark et al. | 361/672 |
| 4,698,727 | 10/1987 | Hibbert et al. | 361/658 |
| 4,717,987 | 1/1988 | Newmark et al. | 361/632 |
| 4,916,574 | 4/1990 | Hancock et al. | 361/649 |
| 4,931,898 | 6/1990 | Cole | 361/648 |
| 4,931,902 | 6/1990 | Cole | 361/635 |
| 4,962,443 | 10/1990 | Cole | 361/658 |
| 5,013,870 | 5/1991 | Navazo | 174/50 |
| 5,043,536 | 8/1991 | De Bartolo, Jr. | 174/65 R |
| 5,057,026 | 10/1991 | Sawal et al. | 439/76 |
| 5,067,905 | 11/1991 | Matsumoto et al. | 439/76 |
| 5,068,495 | 11/1991 | Dahl-Bettermann-Winand | 174/65 R |
| 5,072,071 | 12/1991 | Cassity et al. | 174/65 R |
| 5,134,543 | 7/1992 | Sharp et al. | 361/644 |
| 5,148,348 | 9/1992 | White | 361/658 |
| 5,191,171 | 3/1993 | Bordwell | 174/65 R |
| 5,300,731 | 4/1994 | DeBartolo, Jr. et al. | 174/65 R X |

Primary Examiner—Leo P. Picard
Assistant Examiner—David Tone
Attorney, Agent, or Firm—Martin J. Moran

[57] ABSTRACT

A polymeric electrical enclosure has an electrical access knockout having a plurality of concentric grooves integrally molded into a wall section of reduced thickness. A plurality of angularly spaced, frangible flow leaders all bridge the outermost groove, with a lesser number bridging the remaining concentric grooves to facilitate the flow of material during molding to the knockout segments defined by the grooves. The concentric grooves are progressively deeper from the outermost to the innermost to aid in selective removal of inner segments without fracture of the outer segments. A flow leader which bridges all the grooves becomes narrower at the inner grooves, as less material need flow through that section of the flow leader, and the narrower section fractures sooner, thus aiding in selective removal of the inner segments of the knockout.

15 Claims, 2 Drawing Sheets

POLYMERIC ELECTRICAL ENCLOSURE WITH IMPROVED KNOCKOUT

BACKGROUND OF THE INVENTION

1. Field of the Invention

This invention relates to polymeric electrical enclosure having electrical access knockouts integrally molded into the enclosure walls.

2. Background Information

Polymeric electrical enclosures, such as load centers and switches, commonly employ molded knockouts to permit entrance or exit of electrical conductors. These knockouts typically are molded as an integral part of the enclosure. To date, these knockouts have been restricted to having one or two "rings" or segments to accommodate different sizes of electrical conductors, conduits or fittings. The tings are formed by concentric grooves molded into the enclosure wall. A flow leader bridges the grooves to facilitate material flow to the encircled wall portions during the molding process. Examples of polymeric enclosures with such integral knockouts are shown for instance in U.S. Pat. Nos. 4,688,146 and 5,148,348. The enclosure of U.S. Pat. No. 4,688,146 utilizes two diametrically opposite flow leaders aligned with the enclosure mold gate to feed material across two grooves of an integrally molded knockout.

There is a need for an improved polymeric electrical enclosure with integrally molded knockouts which can accommodate a greater range of sizes of conductors, conduits and fittings.

There is also a need for such an improved polymeric electrical enclosure in which the desired size opening in the knockout, especially the smaller sizes, can be easily and reliably selected.

There is also a need for such an improved polymeric electrical enclosure which can be used with snap-in fittings requiring relatively thin wall thicknesses while maintaining the structural and insulative integrity of the enclosure.

SUMMARY OF THE INVENTION

These needs and others are satisfied by the invention which is directed to a polymeric enclosure in which an electrical access knockout integrally molded into a wall has a plurality of concentric grooves defining knockout segments and a plurality of angularly displaced flow leaders all of which bridge the outermost groove, and a lesser number of which bridge the remaining, inner grooves. This arrangement permits material to flow to all of the segments of the integral knockout during molding, and provides greater structural support for the outermost segment at least, therefore making it easier, and increasing the reliability of, selectively removing only a desired number of knockout segments. The reliability of selectivity is enhanced by making the grooves progressively deeper from the outer most to the inner most. Also, the knockout segments are preferably thinner than the wall in which the knockout is integrally molded. This also permits the smaller knockouts to be used with snap-in fittings which require a thinner wall surrounding the opening.

In a preferred form, the knockout has three grooves defining three knockout segments. Three flow leaders are spaced approximately 120° apart. One flow leader bridges all three grooves and preferably is aligned with the mold gate for the enclosure wall. The remaining two flow leaders only bridge the outer groove and are narrower than the first flow leader where it bridges the outer groove. This first flow leader is as narrow at the inner groove as the second and third flow leaders are at the outer groove, and may be the same width at the middle groove as at the outer groove or as at the inner groove.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
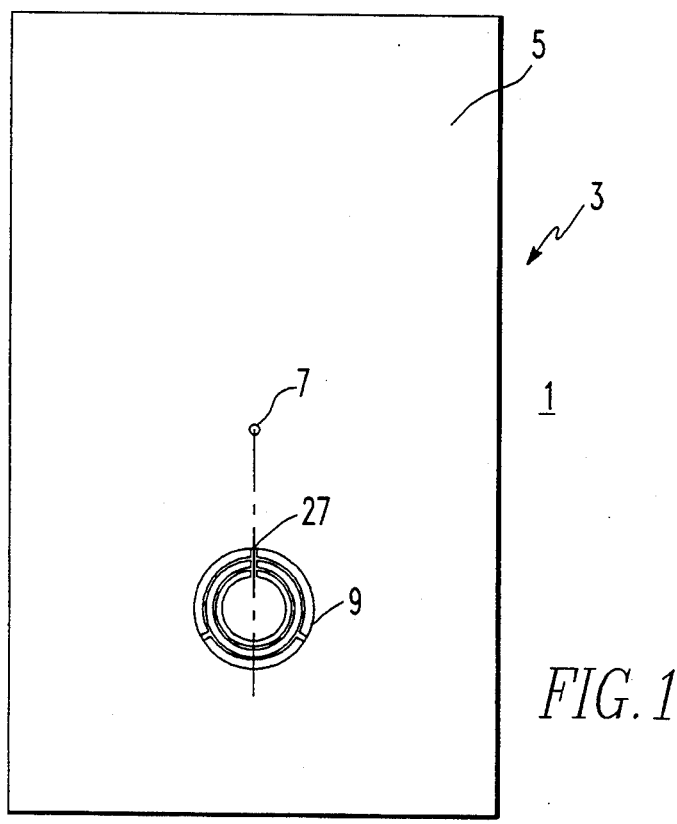
FIG. 1 is an elevation view of a polymeric electrical enclosure incorporating an electrical access knockout in accordance with the invention.
Figure 2:
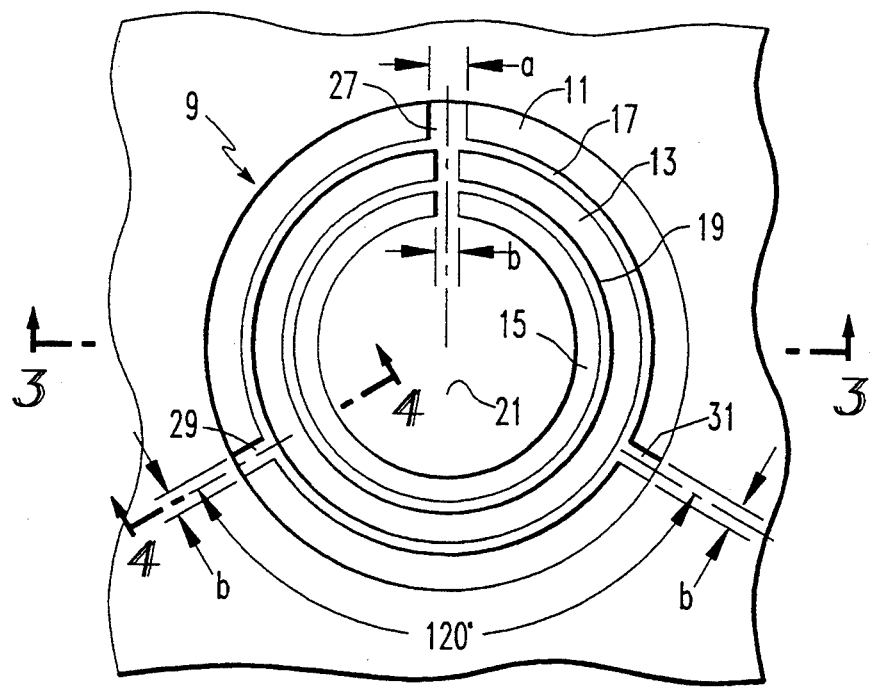
FIG. 2 is a plan view in enlarged scale of the knockout shown in FIG. 1.
Figure 3:
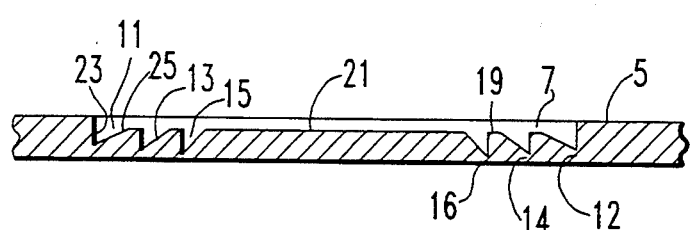
FIG. 3 is a fragmentary sectional view through the knockout of FIG. 2 taken along the line 3—3.
Figure 4:
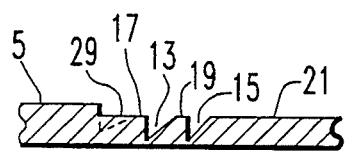
FIG. 4 is another fragmentary sectional view through the knockout of FIG. 2 taken along the line 4—4.

FIG. 1 illustrates generically a polymeric electrical enclosure 1, which may be for example a load center or a switch, the details of which are not relevant to the present invention. The enclosure 1, comprises an electrically insulative housing 3 having a number of walls such as the wall 5. The housing 3 is molded in a well known manner from a polymeric material introduced into a mold (not shown) through a mold gate 7 which is severed after the housing is removed from the mold. The housing 3 has an electrical access knockout 9 integrally molded in the wall 5. As best seen in FIGS. 2-4, the knockout 9 has three concentric grooves 11, 13 and 15 defining three knockout segments 17, 19 and 21. These knockout segments 17, 19, 21 are thinner than the surrounding wall 5. As an example, the knockout segments can have a thickness of 0.090 inches in a wall which is 0.120 inches thick. The advantage of thinner knockout segments will be discussed below.

Each of the grooves 11, 13 and 15 has a vertical outer wall 23 and an inner wall 25 which is bevelled radially inwardly. This generates a stress riser at the apex of the groove to produce a clean separation at the base of the vertical outer wall 23. The outer groove 11 is shallower than the middle groove 13 which in turn is shallower than the inner groove 15. Again, by way of example, the outer groove 11 can leave a web 12 which is 0.030 inches thick, while the middle groove 13 leaves a web 14 which is 0.023 inches thick and the web 16 left by the inner groove 15 is 0.018 inches thick. This makes the inner knockout segment 21 weaker than the others and enhances the reliability of selectively only removing the inner segment. Likewise, the middle groove 13 breaks through before the outer groove 11, thereby making it easier to remove the middle segment 19 while leaving the outer segment 17 in place.

Three flow leaders 27, 29 and 31 angularly spaced about 120° apart, radially bridge the outer groove 11. The first flow leader 27 also bridges the middle groove 13 and the inner groove 15. The remaining flow leaders 29 and 31 only bridge the outer groove 11. All of the flow leaders 27, 29, 31 have the same reduced thickness as the knockout segments 17, 19, 21. The first flow leader 27 has a first width "a" at the outer groove 11, while the second and third flow leaders 29 and 31 have a second width "b" which is less than the width "a". The first flow leader 27 has a narrower width, such as for example the same width "b" as the second and third flow leaders, where it bridges the middle groove 13 and the inner groove 15.

The flow leaders 27, 29, 31 facilitate the flow of material across the grooves 11, 13, 15 to the knockout segments 17, 19, 21. The greater width "a" of the first flow leader 27 at the outer groove 11 allows it to feed material to all three knockout segments. Preferably, this first flow leader 27 is aligned with the mold gate 7 to produce the required material flow (See FIG. 1).

The three segment knockout 9 provides increased flexibility in the use of enclosure 1 with a range of sizes of conductors, conduits and fittings. If the smallest opening is needed, the inner segment 21 is tapped with a hammer or other tool. As the web left by the inner groove 15 is the thinnest, and therefore the weakest, it tends to fracture first without fracture of the webs formed by the grooves 13 and 11. The flow leader 27 being thin and narrow also readily fractures so that the circular segment 21 is removed. Some types of smaller fittings require a thinner edge than the typical enclosure wall surrounding the knockout opening for engagement. The reduced thickness of the segments 19 and 17 provide this thinner engagement edge.

If the intermediate size opening is required, the segment 19 as well as the segment 21 is knocked out. As the groove 13 is deeper than the groove 11, the segment 19 will tend to separate before the segment 17. In addition, the two additional flow leaders 29 and 31 bridging the outer groove 11 and the greater width of the flow leader 27 at the groove 11 assure that the segment 19 can be selectively removed while the segment 17 remains intact. However, if the largest opening is needed the groove 11 and the three flow leaders bridging the groove 11 can be fractured to remove the segment 17.

Figure 5:
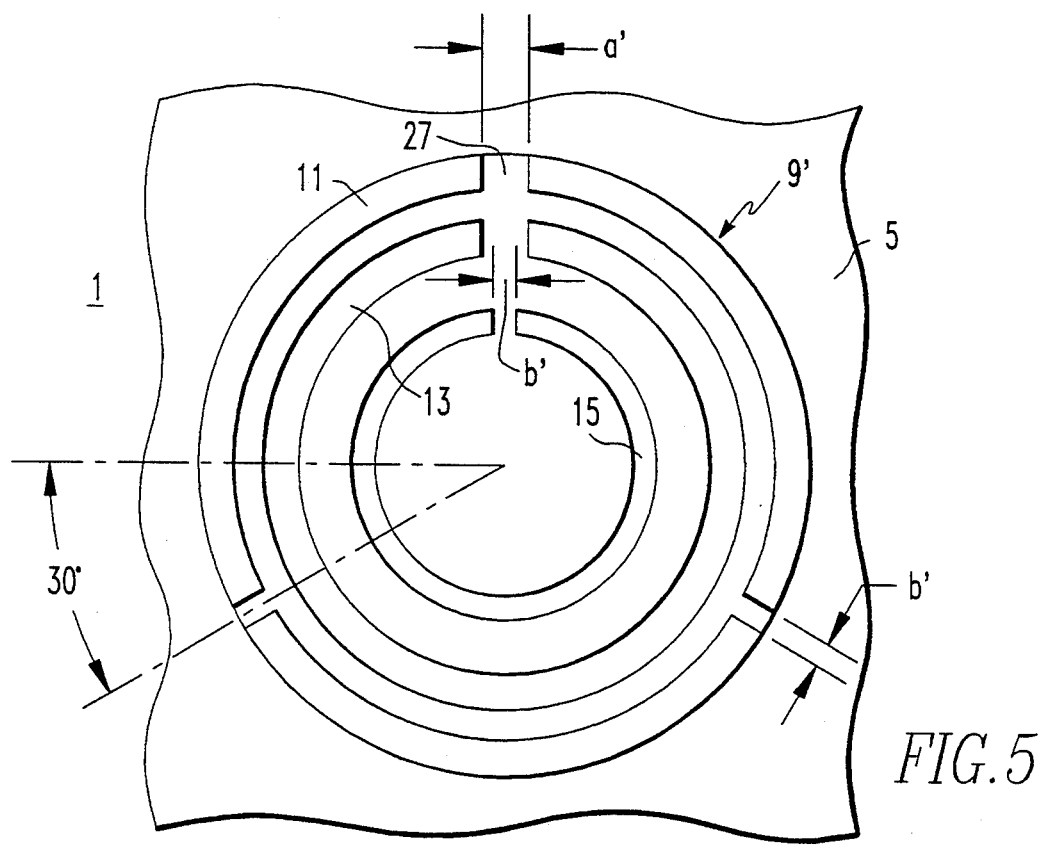
FIG. 5 is a plan view of another embodiment of a knockout in accordance with the invention.

A modified embodiment of an enclosure 1 with an electrical access knockout 9' in the wall 5 is illustrated in FIG. 5. This knockout 9' is illustrated in FIG. 5. This knockout 9' differs from the knockout 9 in that the first flow leader 27' has the same width "a'" where it bridges the middle groove 13 as where it bridges the outer groove 11, rather than the same width "b'" that it has at the inner groove 15. This embodiment is suitable for larger diameter knockouts where the segments 19 and 21 need more material. The middle segment 19 can still be easily removed without separating the outer segment 17, because the groove 13 is deeper than the groove 11 and the outer groove 11 is bridged by the flow leaders 29 and 31 as well as the flow leader 27. Alternatively, the leader 27' may have progressively narrower widths from the outer groove to the inner groove.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A polymeric enclosure for electrical apparatus comprising:
    a molded electrically insulative housing having walls of a predetermined thickness; and
    an electrical access knockout integrally formed in a wall of said housing and having concentric outer, middle and inner grooves and three angularly displaced flow leaders each bridging at least said outer groove and at least one flow leader bridging said middle and inner grooves also.

2. The enclosure of claim 1 wherein said at least one wall is molded from resin introduced through a mold gate, and wherein said at least one flow leader is aligned with said mold gate.

3. The enclosure of claim 1 wherein said flow leaders are angularly spaced about 120° apart.

4. The enclosure of claim 3 wherein said at least one flow leader is narrower at said inner groove than at said outer groove.

5. The enclosure of claim 4 wherein said at least one flow leader is narrower at said middle groove than at said outer groove.

6. The enclosure of claim 3 wherein said at least one flow leader has a same width at said outer groove and at said middle groove.

7. The enclosure of claim 3 wherein said at least one flow leader has a width at said inner groove which is substantially the same as a width of said at least one flow leader at said middle groove.

8. The enclosure of claim 1 wherein said grooves define knockout segments in said wall which have a reduced thickness which is less than said predetermined thickness.

9. The enclosure of claim 8 wherein said flow leaders have a thickness substantially the same as said reduced thickness.

10. The enclosure of claim 9 wherein said middle groove has a depth which is greater than a depth of said outer groove but less than a depth of said inner groove.

11. The enclosure of claim 10 wherein said outer groove, middle groove and inner groove are beveled radially inwardly.

12. A polymeric enclosure for electrical apparatus comprising:
    a molded electrically insulative housing having walls of a predetermined thickness; and
    a segmented electrical access knockout integrally formed in one of said walls of said housing and having a plurality of concentric circular grooves including an outer groove, and a plurality of angularly spaced flow leaders, all of which bridge said outer groove and a lesser number of which bridge the remaining grooves.

13. The enclosure of claim 12 wherein said plurality of concentric circular grooves define knockout segments having a reduced thickness less than said predetermined thickness.

14. The enclosure of claim 13 wherein said plurality of concentric grooves taken from said outer groove inward are progressively deeper.

15. The enclosure of claim 14 wherein at least one leader bridges all of said grooves and is wider at said outer groove than at an inner most groove.

* * * * *